(12) United States Patent
Flemming et al.

(10) Patent No.: US 9,869,371 B2
(45) Date of Patent: Jan. 16, 2018

(54) AUTOMATIC TRANSMISSION AND A DOG CLUTCH FOR AN AUTOMATIC TRANSMISSION

(71) Applicant: ZF Friedrichshafen AG, Friedrichshafen (DE)

(72) Inventors: Nico Flemming, Waterloo, SC (US); David Edward Drosback, Greenville, SC (US); Abhishek Baradwaj Raydurga Palegar, Simpsonville, SC (US); Thomas Geiss, Simpsonville, SC (US)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 77 days.

(21) Appl. No.: 14/729,334

(22) Filed: Jun. 3, 2015

(65) Prior Publication Data
US 2016/0356341 A1    Dec. 8, 2016

(51) Int. Cl.
| | |
|---|---|
| *F16D 27/09* | (2006.01) |
| *F16H 3/66* | (2006.01) |
| *F16D 11/14* | (2006.01) |
| *F16H 3/78* | (2006.01) |
| *F16H 3/44* | (2006.01) |

(52) U.S. Cl.
CPC ............. *F16H 3/66* (2013.01); *F16D 11/14* (2013.01); *F16D 27/09* (2013.01); *F16H 3/78* (2013.01); *F16H 2003/442* (2013.01); *F16H 2003/445* (2013.01); *F16H 2200/0065* (2013.01); *F16H 2200/2012* (2013.01); *F16H 2200/2046* (2013.01); *F16H 2200/2064* (2013.01); *F16H 2200/2094* (2013.01)

(58) Field of Classification Search
None
See application file for complete search history.

(56) References Cited

U.S. PATENT DOCUMENTS

| | | | | | |
|---|---|---|---|---|---|
| 2,571,848 | A | * | 10/1951 | Ehlers | B64D 35/00 192/101 |
| 2,749,453 | A | * | 6/1956 | Cassell | G10K 1/064 310/30 |
| 3,183,410 | A | * | 5/1965 | Flora | G05B 19/06 335/229 |
| 4,243,899 | A | * | 1/1981 | Jaffe | H02K 41/033 310/14 |
| 6,079,539 | A | * | 6/2000 | Fetcho | F16D 11/10 192/69.9 |
| 6,512,435 | B2 | * | 1/2003 | van Namen | E05B 47/00 335/229 |
| 6,639,496 | B1 | * | 10/2003 | van Namen | E05B 47/00 335/229 |
| 8,652,004 | B2 | * | 2/2014 | Herbeth | B60W 10/06 475/116 |

(Continued)

FOREIGN PATENT DOCUMENTS

GB          1136418 A  *  12/1968  ......... H01F 7/1615

*Primary Examiner* — Justin Holmes
(74) *Attorney, Agent, or Firm* — Dority & Manning, P.A.

(57) ABSTRACT

A dog clutch for an automatic transmission is provided. The dog clutch includes a magnet that is mounted to a sliding clutch. A solenoid is positioned adjacent the magnet and is configured for selectively adjusting the dog clutch between an engaged configuration and a disengaged configuration. A related automatic transmission is also provided.

16 Claims, 5 Drawing Sheets

(56) References Cited

U.S. PATENT DOCUMENTS

| | | | | |
|---|---|---|---|---|
| 2003/0205941 A1* | 11/2003 | Suzuki | ............... | H01F 7/1615 |
| | | | | 310/14 |
| 2010/0277264 A1* | 11/2010 | Charnley | ............ | E05B 47/063 |
| | | | | 335/234 |
| 2016/0265601 A1* | 9/2016 | Mastie | ............... | F16D 27/118 |

* cited by examiner

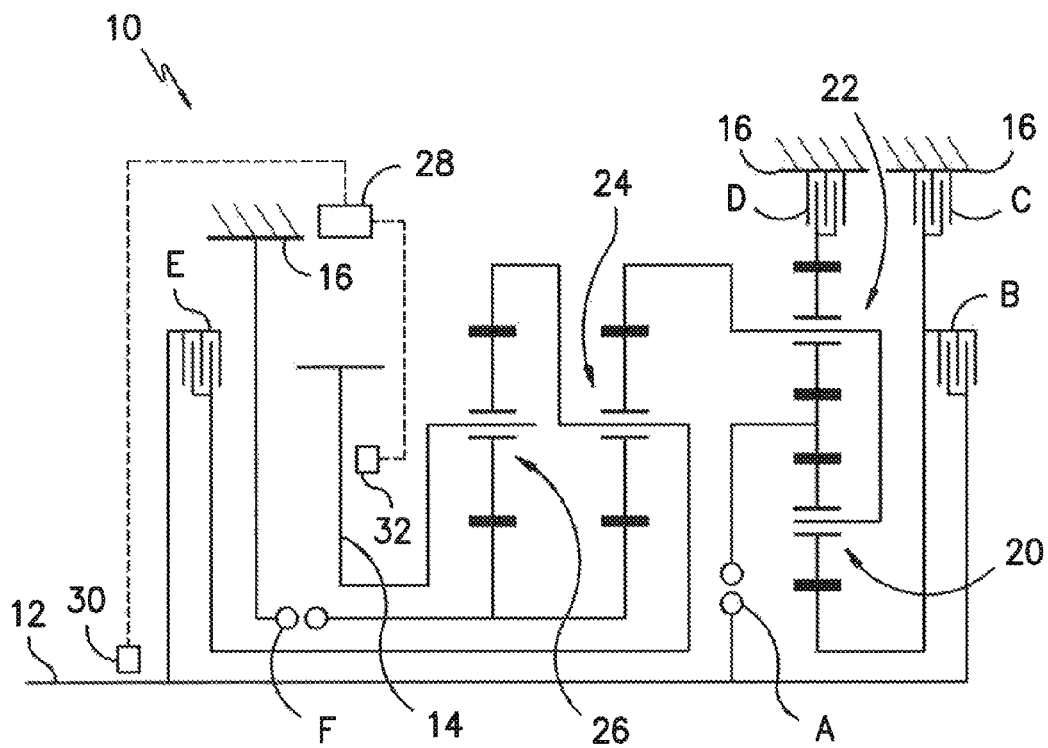
FIG. -1-
FIG. -2-

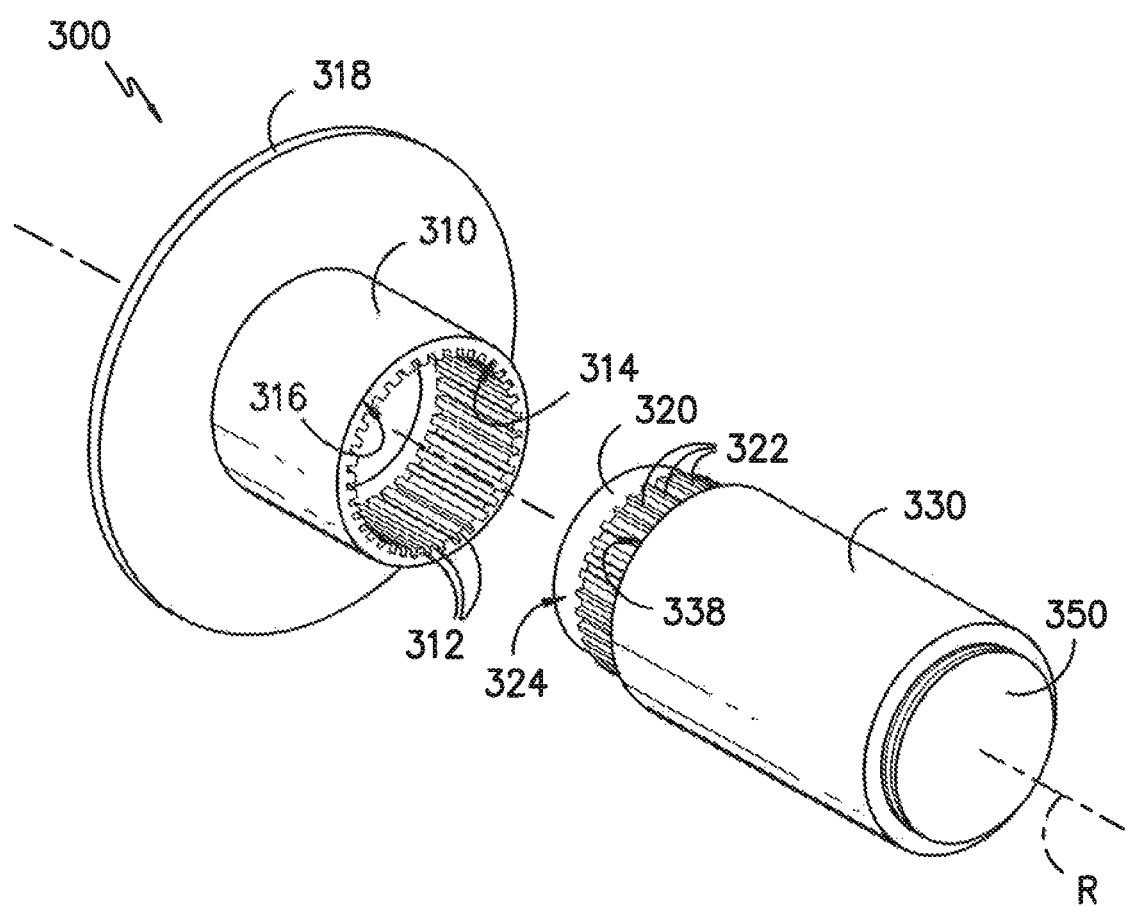
FIG. -3-

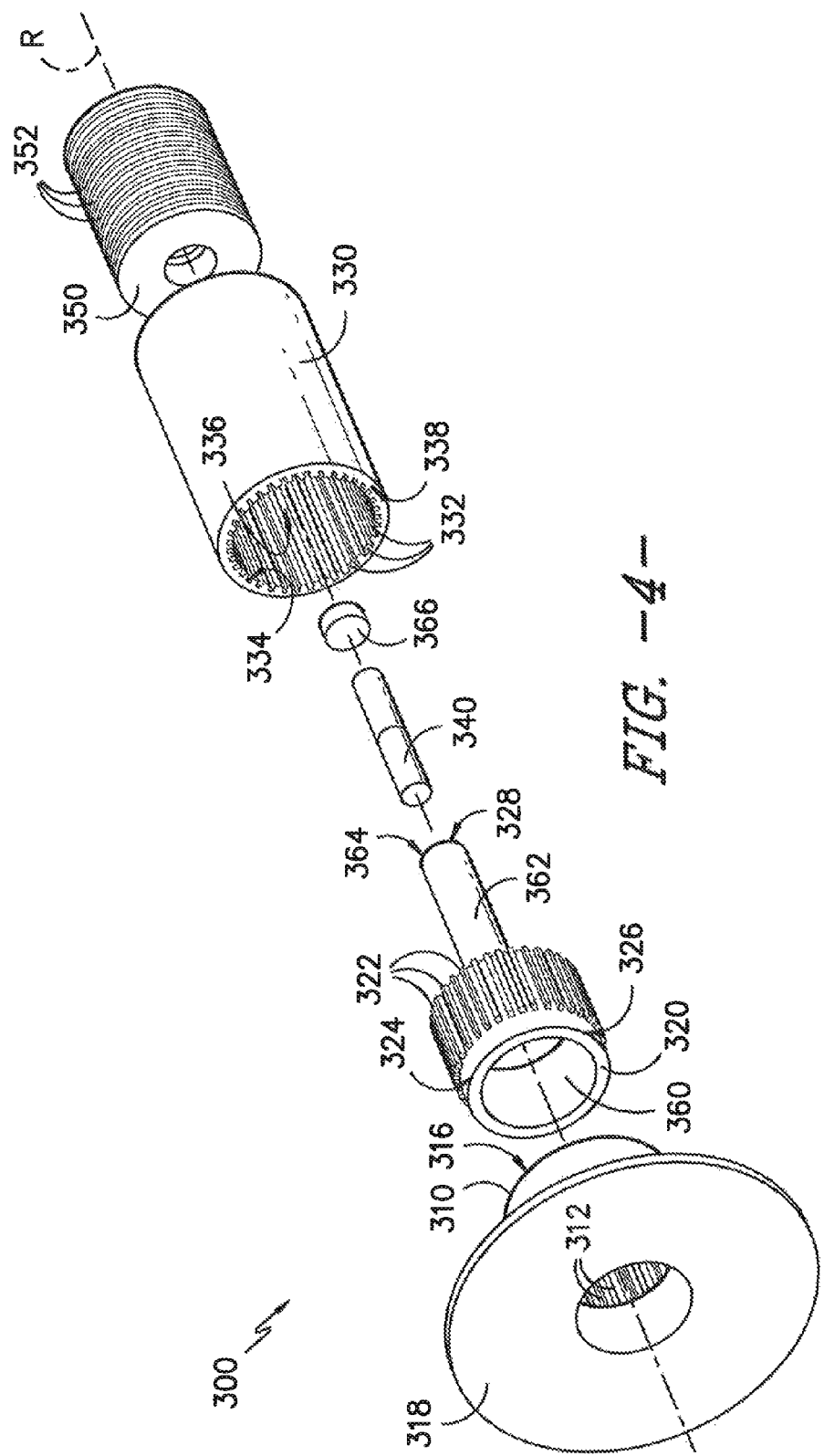
FIG. -4-

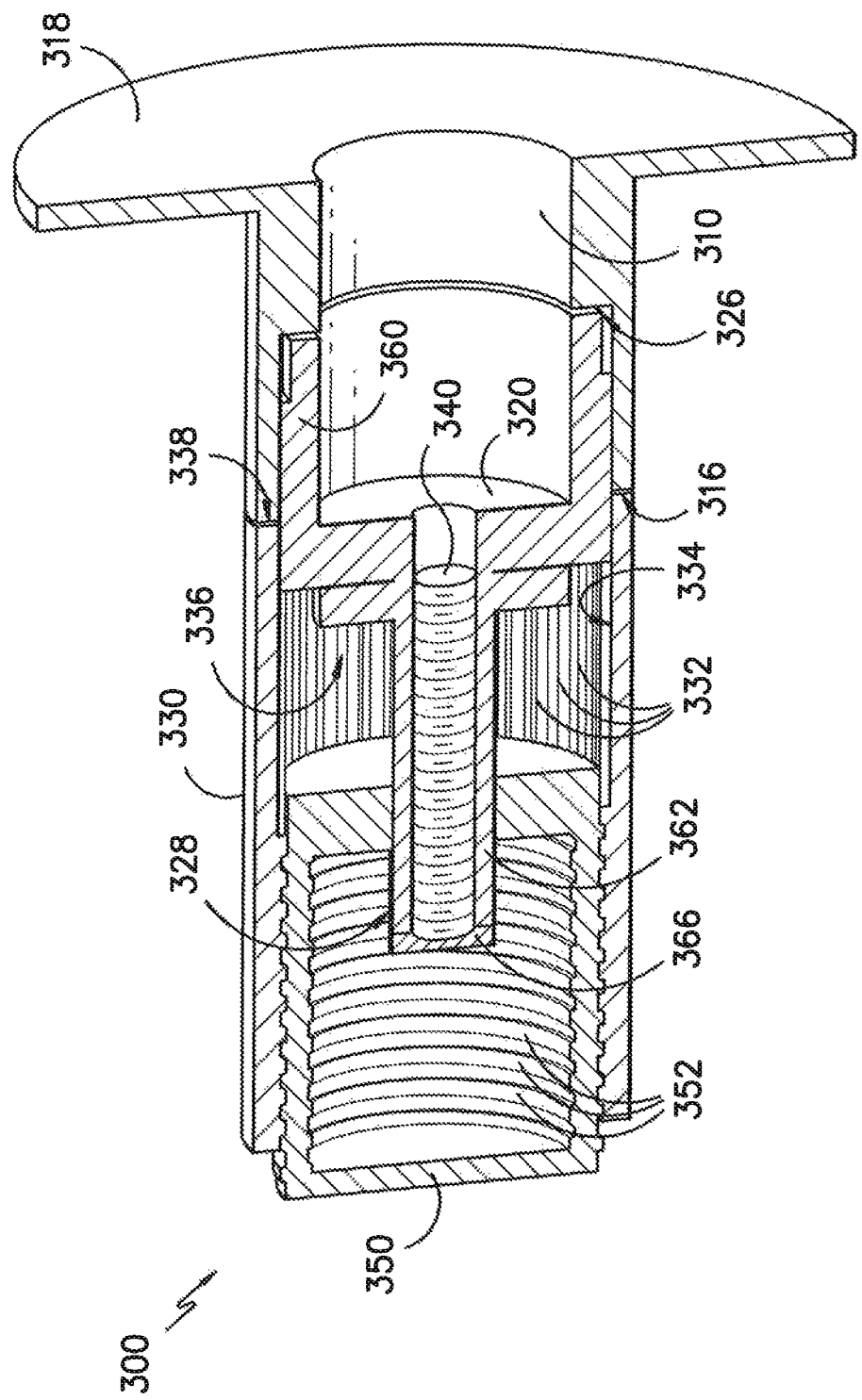
FIG. -5-

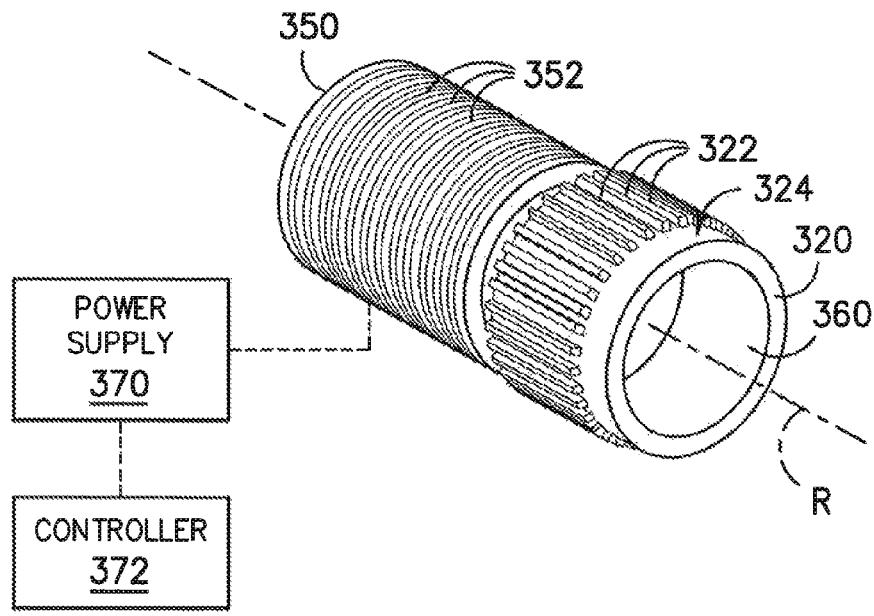
FIG. -6-
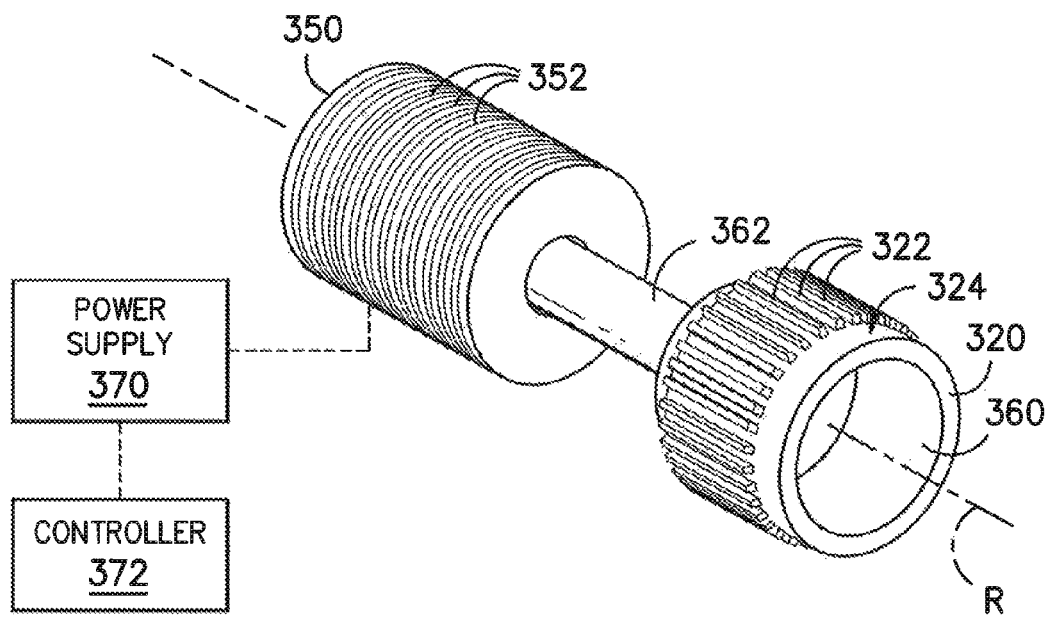
FIG. -7-

AUTOMATIC TRANSMISSION AND A DOG CLUTCH FOR AN AUTOMATIC TRANSMISSION

FIELD OF THE INVENTION

The present subject matter relates generally to automatic transmissions and shifting elements for automatic transmissions.

BACKGROUND OF THE INVENTION

Automatic transmissions generally include at least one planetary gear set and a plurality of shift elements. The shift elements selectively engage components of the planetary gear sets in order to hinder or prevent rotation of the components. Selective actuation of the shift elements adjusts the gear ratio of the automatic transmission and shifts the automatic transmission between its various gears.

Certain automatic transmissions include dog clutch shifting elements. During various gear shifts, the dog clutch is engaged or closed. Engaging the dog poses certain challenges. For example, certain dog clutches are hydraulically actuated. However, creating and maintaining the hydraulic pressure necessary to actuate the dog clutch can be difficult. In addition, hydraulically actuated dog clutches can require compliance with strict cleanliness guidelines in order to prevent debris from negatively affecting performance of the dog clutch. Further, hydraulically actuated dog clutches generally include O-rings, drilled passageways through cast materials and other components that can necessitate a complex transmission design.

Accordingly, an automatic transmission with features for assisting with actuating a shifting element of the automatic transmission would be useful. In particular, a dog clutch for an automatic transmission with features for assisting with actuating the dog clutch without hydraulic fluid would be useful.

BRIEF DESCRIPTION OF THE INVENTION

The present subject matter provides a dog clutch for an automatic transmission. The dog clutch includes a magnet that is mounted to a sliding clutch. A solenoid is positioned adjacent the magnet and is configured for selectively adjusting the dog clutch between an engaged configuration undo disengaged configuration. A related automatic transmission is also provided. Additional aspects and advantages of the invention will be set forth in part in the following description, or may be apparent from the description, or may be learned through practice of the invention.

In a first exemplary embodiment, an automatic transmission is provided. The automatic transmission includes a plurality of planetary gear sets. A plurality of shifting elements includes a dog clutch. The dog clutch includes a mating clutch mounted to a gear of the plurality of planetary gear sets. The mating clutch defines a plurality of projections. A clutch sleeve defines a plurality of projections. A sliding clutch defines a plurality of projections. A magnet is mounted to the sliding clutch. A solenoid is positioned adjacent the magnet and is configured for selectively adjusting the dog clutch between an engaged configuration and a disengaged configuration. The solenoid positions the sliding clutch such that the plurality of projections of the sliding clutch mesh with both the plurality of projections of the mating clutch and the plurality of projections of the clutch sleeve in the engaged configuration. The solenoid positions the sliding clutch such that the plurality of projections of the sliding clutch does not mesh with the plurality of projections of the mating clutch in the disengaged configuration.

In a second exemplary embodiment, a dog clutch for an automatic transmission is provided. The dog clutch includes a mating clutch that defines a plurality of projections at an inner surface of the mating clutch. A clutch sleeve defines a plurality of projections at an inner surface of the clutch sleeve. A sliding clutch defines a plurality of projections at an outer surface of the sliding clutch. A magnet is mounted to the sliding clutch. A solenoid is positioned adjacent the magnet and is configured for selectively adjusting the dog clutch between an engaged configuration and a disengaged configuration. The solenoid positions the sliding clutch such that the plurality of projections of the sliding clutch mesh with both the plurality of projections of the mating clutch and the plurality of projections of the clutch sleeve in the engaged configuration. The solenoid positions the sliding clutch such that the plurality of projections of the sliding clutch does not mesh with the plurality of projections of the mating clutch in the disengaged configuration.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 provides a schematic view of an automatic transmission according to an exemplary embodiment of the present subject matter.

FIG. 2 illustrates a table of an exemplary shifting scheme as may be used with the exemplary automatic transmission of FIG. 1.

FIG. 3 provides a partially-exploded perspective view of a dog clutch according to an exemplary embodiment of the present subject matter.

FIG. 4 provides an exploded view of the exemplary dog clutch of FIG. 3.

FIG. 5 provides a section view of the exemplary dog clutch of FIG. 3.

FIGS. 6 and 7 provide perspective views of a solenoid and sliding clutch of the exemplary dog clutch of FIG. 3 with the sliding clutch shown in various positions.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a schematic view of an automatic transmission 10 according to an exemplary embodiment of the present subject matter. Automatic transmission 10 may be constructed or arranged in a similar manner to the automatic transmission described in U.S. Pat. No. 8,398,522 to Bauknecht et al., which is hereby incorporated by reference for all purposes. Automatic transmission 10 may be used in any suitable vehicle. For example, automatic transmission 10 may be used in a passenger vehicle, such as a car, truck or sport utility vehicle (SUV). Automatic transmission 10 is configured for selectively adjusting a gear ratio of automatic transmission 10, as will be understood by those skilled in the art, in order to provide a suitable mechanical advantage to propel the associated vehicle.

As may be seen in FIG. 1, automatic transmission 10 includes an input shaft 12 and an output shaft 14. Input shaft 12 may be coupled to a turbine of a torque converter in order to link automatic transmission 10 to a motor of an associated vehicle. Output shaft 14 may be coupled a front axle drive shaft of the associated vehicle. Automatic transmission 10 may change gears in order to adjust the gear ratio between the motor and front axle drive shaft of the associated vehicle, as will be understood by those skilled in the art.

Automatic transmission 10 also includes four planetary gear sets: a first planetary gear set 20; a second planetary gear set 22; a third planetary gear set 24 and a fourth planetary gear set 26. In certain exemplary embodiments, as shown in FIG. 1, third and fourth planetary gear sets 24, 26 may be a Simpson planetary gear set, e.g., such that third and fourth planetary gear sets 24, 26 share a joint sun gear or sun gears of third and fourth planetary gear sets 24, 26 are coupled or fixed together. The sun gear of second planetary gear set 22 may also constitute the ring gear of first planetary gear set 20, and planet gears of first and second planetary gear sets 20, 22 may be mounted to a joint planet carrier that is also coupled or fixedly connected to the ring gear of third planetary gear set 24. The planet carrier of third planetary gear set 24 may also be coupled or fixedly connected to the ring gear of fourth planetary gear set 26.

As may be seen in FIG. 1, automatic transmission 10 further includes a plurality of shifting elements. In particular, automatic transmission 10 includes a plurality of non-positive shift elements and at least one positive shifting element. The non-positive shift elements may be any suitable type of non-positive shift elements. For example, the non-positive shift elements may be multidisc friction shift elements or friction bands. In the exemplary embodiment of FIG. 1, the non-positive shifting elements includes a multidisc clutch B, a multidisc brake C, a multidisc brake D and a multidisc clutch E. The positive shifting elements may also be any suitable type of positive shifting elements, e.g., that provide a form fit or torque proof connection. For example, the positive shifting elements may be dog clutches, dog brakes or claw clutches. In the exemplary embodiment of FIG. 1, the at least one positive shifting element includes a dog clutch A and a dog clutch or brake F. As used herein, the term "clutch" may refer to mechanism for coupling or connecting two rotating components and the term "brake" may refer to a mechanism for coupling or connecting a rotating component to a non-rotating or static component.

The shifting elements of automatic transmission 10 selectively adjust between an open or disengaged configuration and a closed or engaged configuration. In the disengaged configuration, the shifting elements do not engage an associated component of the four planetary gear sets, e.g., and do not or negligibly interfere with rotation of the associated component of the four planetary gear sets relative to the shifting elements. Conversely, in the engaged configuration, the shifting elements engage the associated component of the four planetary gear sets, e.g., and hinder or prevent rotation of the associated component of the four planetary gear sets relative to the shifting elements. As may be seen in FIG. 1, dog clutch A selectively connects or couples input shaft 12 to the sun gear of second planetary gear set 22 and the ring gear of first planetary gear set 20. Multidisc clutch B selectively connects or couples input shaft 12 to the sun gear of first planetary gear set 20. Multidisc brake C selectively connects or couples a transmission housing 16 to the sun gear of first planetary gear set 20. Multidisc brake D selectively connects or couples transmission housing 16 to the ring gear of second planetary gear set 22. Multidisc clutch E selectively connects or couples input shaft 12 to the planet carrier of third planetary gear set 24 and the ring gear of fourth planetary gear set 26. Dog clutch F selectively connects or couples transmission housing 16 to the sun gear of third and fourth planetary gear sets 24, 26.

Automatic transmission 10 also includes an electronic control unit 28, an input speed sensor 30 and an output speed sensor 32. Electronic control unit 28 is in operative communication with various components of automatic transmission 10, including input speed sensor 30 and output speed sensor 32, to regulate operation of automatic transmission 10. Electronic control unit 28 may include a memory and microprocessor, such as a general or special purpose microprocessor operable to execute programming instructions or micro-control code associated with operating of automatic transmission 10. The memory may represent random access memory such as DRAM, or read only memory such as ROM or FLASH. Alternatively, electronic control unit 28 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Electronic control unit 28 may be mounted on an exterior of transmission housing 16. Electronic control unit 28 is in operative communication with solenoid valves of the shifting elements of automatic transmission 10. Thus, electronic control unit 28 may selectively adjust the shifting elements between the engaged configuration and the disengaged configuration, e.g., by selectively opening and closing the associated solenoid valves of the shifting elements. In such a manner, electronic control unit 28 may shift automatic transmission 10 between gears during operation of automatic transmission 10, e.g., based at least in part on signals from input speed sensor 30 and output speed sensor 32, as will be understood by those skilled in the art.

Input speed sensor 30 is configured for measuring a speed, e.g., rotations per minute (RPM), of input shaft 12. Input speed sensor 30 may be positioned adjacent input shaft 12 or a turbine of an associated torque coupling. Input speed sensor 30 may be any suitable type of sensor. For example, input speed sensor 30 may be a Hall effect sensor, an optical sensor, etc. Electronic control unit 28 may receive a signal from input speed sensor 30 corresponding to the speed of input shaft 12.

Output speed sensor 32 is configured for measuring a speed, e.g., rotations per minute (RPM), of output shaft 14. Output speed sensor 32 may be positioned adjacent output shaft 14. Output speed sensor 32 may be any suitable type of sensor. For example, output speed sensor 32 may be a Hall effect sensor, an optical sensor, etc. Electronic control unit 28 may receive a signal from output speed sensor 32 corresponding to the speed of output shaft 14.

FIG. 2 illustrates a table 200 of an exemplary shifting scheme as may be used with automatic transmission 10. As may be seen in FIG. 2, automatic transmission 10 includes nine forward gears and one reverse gear. The forwards gears include: first gear "1", second gear "2", third gear "3", fourth gear "4", fifth gear "5", sixth gear "6", seventh gear "7", eighth gear "8", and ninth gear "9". The reverse gear is labeled "R". In table 200, cells filled with "x" indicate the engaged configuration, and blank cells indicate the disengaged configuration. Thus, e.g., dog clutch A, multidisc brake D and dog clutch F are in the engaged configuration in first gear, and multidisc clutch B, multidisc brake C and multidisc clutch E are in the disengaged configuration in first gear. As another example, dog clutch A, multidisc brake C and dog clutch F are in the engaged configuration in second gear, and multidisc clutch B, multidisc brake D and multidisc clutch E are in the disengaged configuration in second gear. In the fourth gear, dog clutch A, multidisc clutch E and dog clutch F are in the engaged configuration. It should be understood that in certain exemplary embodiments, dog clutch A need not be in the engaged configuration to operate automatic transmission 10 in fourth gear. Thus, multidisc clutch E and dog clutch F may be the only shifting elements of automatic transmission 10 in the engaged configuration to operate automatic transmission 10 in fourth gear, in certain exemplary embodiments.

As discussed above, automatic transmission 10 includes nine forward gears and one reverse gear. Thus, automatic transmission 10 is generally referred to as a "nine-speed automatic transmission." However, it should be understood that automatic transmission 10 is provided by way of example only and that the present subject matter may be used in or with any suitable automatic transmission. Thus, the present subject matter is not intended to be limited to use with automatic transmission 10. As an example, the present subject matter may be used in automatic transmissions having five forward gears, six forward gears, eight forward gears, etc.

FIG. 3 provides a partially-exploded perspective view of a dog clutch 300 according to an exemplary embodiment of the present subject matter. FIG. 4 provides an exploded view of dog clutch 300. FIG. 5 provides a section view of dog clutch 300. Dog clutch 300 may be used in any suitable automatic transmission. For example, dog clutch 300 may be used in automatic transmission 10 as dog clutch A and/or dog clutch F (FIG. 1). Thus, while described in greater detail below in the context of automatic transmission 10, it will be understood that dog clutch 300 may be used in or with any other suitable transmission, such as a six-speed automatic transmission, an eight-speed automatic transmission, a ten-speed automatic transmission, etc., in alternative exemplary embodiments. As discussed in greater detail below, dog clutch 300 includes features for assisting with shifting dog clutch 300 between an engaged configuration and a disengaged configuration, e.g., without using hydraulic fluid.

As may be seen in FIGS. 3-5, dog clutch 300 includes a mating gear or clutch 310, a sliding clutch 320 and a clutch sleeve 330. Mating clutch 310 may be mounted or fixed to any suitable component of automatic transmission 10, e.g., such that mating clutch 310 does not rotate relative to such component. For example, mating clutch 310 may be mounted or fixed to input shaft 12 when used as dog clutch A or to transmission housing 16 when used as dog clutch F. Clutch sleeve 330 may also be mounted or fixed to any suitable component of automatic transmission 10, e.g., such that clutch sleeve 330 does not rotate relative to such component. For example, clutch sleeve 330 may be mounted or fixed to the sun gear of second planetary gear set 22 and the ring gear of first planetary gear set 20 when used as dog clutch A or to the sun gear of third and fourth planetary gear sets 24, 26 when used as dog clutch F.

As discussed above, dog clutch 300 is adjustable between an engaged configuration and a disengaged configuration. In the engaged configuration, sliding clutch 320 engages mating clutch 310 and clutch sleeve 330, e.g., such that mating clutch 310 and clutch sleeve 330 rotate at a common angular velocity about an axis of rotation R. Conversely, in the disengaged configuration, sliding clutch 320 does not engage clutch sleeve 330, e.g., such that mating clutch 310 and clutch sleeve 330 may rotate relative to each other about the axis of rotation R. As discussed in greater detail below, sliding clutch 320 is configured for moving axially, e.g., along the axis of rotation R, in order to shift dog clutch 300 between the engaged and disengaged configurations.

Mating clutch 310 defines a plurality of projections or splines 312. Splines 312 of mating clutch 310 may be positioned on or at an inner surface 314 of mating clutch 310. Splines 312 of mating clutch 310 may be milled, broached or otherwise suitably formed on inner surface 314 of mating clutch 310. Splines 312 of mating clutch 310 may also extend axially along the inner surface 314 of mating clutch 310 and also radially inward from inner surface 314 of mating clutch 310, as shown in FIG. 3. Mating clutch 310 may have a generally cylindrical shape with a base plate 318 mounted thereto.

Clutch sleeve 330 also defines a plurality of projections or splines 332. Splines 332 of clutch sleeve 330 may be positioned on or at an inner surface 334 of clutch sleeve 330. Splines 332 of clutch sleeve 330 may be milled, broached or otherwise suitably formed on inner surface 334 of clutch sleeve 330. Splines 332 of clutch sleeve 330 may also extend axially along the inner surface 334 of clutch sleeve 330 and also radially inward from inner surface 334 of clutch sleeve 330, as shown in FIG. 4. In particular, clutch sleeve 330 defines an interior chamber 336. Inner surface 334 of clutch sleeve 330 faces or is positioned adjacent interior chamber 336 of clutch sleeve 330, and splines 332 of clutch sleeve 330 extend radially inward from inner surface 334 of clutch sleeve 330 into interior chamber 336 of clutch sleeve 330. Clutch sleeve 330 may have a generally cylindrical shape.

Like mating clutch 310 and clutch sleeve 330, sliding clutch 320 also defines a plurality of projections or splines 322. Splines 322 of sliding clutch 320 may be positioned on or at an outer surface 324 of sliding clutch 320. Splines 322 of sliding clutch 320 may be milled, shaped, extruded or otherwise suitably formed on outer surface 324 of sliding clutch 320. Splines 322 of sliding clutch 320 may also extend axially along the outer surface 324 of sliding clutch 320 and also radially outward front outer surface 324 of sliding clutch 320, as shown in FIG. 4.

Sliding clutch 320 may include or define any suitable number of splines 322. For example, splines 322 of sliding clutch 320 may include at least ten splines, at least fifteen splines, at least twenty splines, etc. Splines 322 of sliding clutch 320 may also be uniformly distributed or spaced apart from one another on outer surface 324 of sliding clutch 320, as shown in FIG. 4. The number and/or sizing of splines 322 of sliding clutch 320 may correspond to or match the number and/or sizing of splines 312 of mating clutch 310 and splines 332 of clutch sleeve 330. Thus, splines 322 of sliding clutch 320 may mesh with splines 312 of mating clutch 310 and splines 332 of clutch sleeve 330, as discussed in greater detail below. Splines 322 of sliding clutch 320 may mesh with splines 322 of clutch sleeve 330 in order to hinder rotation of sliding clutch 320 relative to clutch sleeve 330 while permitting translation of sliding clutch 320 relative to clutch sleeve 330, e.g., along the axis or rotation R. Splines 322 of sliding clutch 320 may mesh with splines 322 of clutch sleeve 330 in both the engaged and disengaged configurations.

Dog clutch 300 also includes a magnet 340. Magnet 340 is mounted to sliding clutch 320. In particular, sliding clutch 320 extends between a first end portion 326 and a second end portion 328, e.g., along the axis of rotation R. Sliding clutch 320 has a support 360 positioned at or adjacent first end portion 326 of sliding clutch 320 and a hollow post 362 positioned at or adjacent second end portion 328 of sliding clutch 320. Splines 322 of sliding clutch 320 are positioned on or defined by support 360 of sliding clutch 320 at outer surface 324 of sliding clutch 320. Magnet 340 is disposed within hollow post 362, e.g., at or adjacent a distal end portion 364 of hollow post 362. A cap 366 is mounted to hollow post 362 at distal end portion 364 of hollow post 362, e.g., in order to seal magnet 340 within hollow post 362. Hollow post 362 of sliding clutch 320 and/or cap 366 may be constructed of or with a non-ferrous material, such as aluminum, copper, nickel, titanium, etc. Support 360 of sliding clutch 320 may also be constructed of or with a non-ferrous material, e.g., such that support 360 and hollow post 362 of sliding clutch 320 are constructed of a single continuous piece of non-ferrous material. It should be understood that magnet 340 may be mounted to sliding clutch 320 using any other suitable method or mechanism, in alternative exemplary embodiments. For example, fasteners, adhesives, etc. may be used to mount magnet 340 to sliding clutch 320, in alternative exemplary embodiments.

Dog clutch 300 also includes a solenoid 350. Solenoid 350 is positioned adjacent magnet 340 and is configured for selectively adjusting dog clutch 300 between the engaged configuration and the disengaged configuration. For example, a current may be supplied to coils 352 of solenoid 350, and a magnetic field from solenoid 350 may engage magnet 340 in order to move sliding clutch 320 relative to mating clutch 310 and clutch sleeve 330, e.g., without requiring hydraulic fluid to move sliding clutch 320 relative to mating clutch 310 and clutch sleeve 330. Such movement of sliding clutch 320 selectively engages splines 322 of sliding clutch 320 with splines 332 of clutch sleeve 330 in order to shift dog clutch 300 between the engaged and disengaged configurations. In particular, solenoid 350 positions sliding clutch 320 such that splines 332 of sliding clutch 320 mesh with both the splines 312 of mating clutch 310 and the splines 332 of clutch sleeve 330 in the engaged configuration, as shown in FIG. 5. Conversely, solenoid 350 positions sliding clutch 320 such that splines 322 of sliding clutch 320 do not mesh with the splines 312 of mating clutch 310 in the disengaged configuration. Solenoid 350 may be positioned within interior chamber 336 of clutch sleeve 330.

As may be seen in FIG. 5, mating clutch 310 includes an end face 316. Clutch sleeve 330 also includes an end face 338. Mating clutch 310 and clutch sleeve 330 may be positioned adjacent each other, e.g., such that end face 316 of mating clutch 310 is positioned at and/or abuts end face 338 of clutch sleeve 330. In certain exemplary embodiments, mating clutch 310 and clutch sleeve 330 may not translate relative to each other, e.g., along the axis of rotation R, when dog clutch 300 shifts between the engaged and disengaged configurations.

FIGS. 6 and 7 provide perspective views of solenoid 350 and sliding clutch 320 of dog clutch 300 with sliding clutch 320 shown in various positions. As discussed above, a magnetic field from solenoid 350 may engage magnet 340 mounted to sliding clutch 320 in order to move shifting clutch 320 and shift dog clutch 300 between the engaged and disengaged configurations. In FIG. 6, solenoid 350 is shown retracting sliding clutch 320, e.g., such that support 360 of sliding clutch 320 is drawn or urged towards solenoid 350. In FIG. 7, solenoid 350 is shown extending sliding clutch 320, e.g., such that support 360 of sliding clutch 320 is drawn or urged away from solenoid 350. When solenoid 350 retracts sliding clutch 320 as shown in FIG. 6, support 360 of sliding clutch 320 is removed from interior chamber 336 of clutch sleeve 330 and splines 312 of mating clutch 310 are disengaged from splines 322 of sliding clutch 320. Conversely, when solenoid 350 extends sliding clutch 320 as shown in FIG. 7, support 360 of sliding clutch 320 is inserted into interior chamber 336 of clutch sleeve 330 and splines 312 of mating clutch 310 mesh with splines 322 of sliding clutch 320. In such a manner solenoid 350 may move shifting clutch 320 in order to shift dog clutch 300 between the engaged and disengaged configurations.

Dog clutch 300 also includes a controller 372, such as electronic control unit 28, and a power supply 370, such as an alternator or battery, for regulating operation of solenoid 350. Controller 372 and power supply 370 are shown schematically in FIGS. 6 and 7. Power supply 370 is electrically coupled to solenoid 350, e.g., via suitable wiring, such that power supply 370 selectively directs an electrical current to solenoid 350. Controller 372 is in operative communication with power supply 370 such that controller 372 selectively operates power supply 370 in order to supply the electrical current to solenoid 350. Controller 372 may also regulate the magnitude and/or polarity of the electrical current from power supply 370 to solenoid 350.

Controller 372 is configured for selectively actuating power supply 370 in order to adjust dog clutch 300 between the engaged and disengaged configurations. For example, controller 372 may command power supply 370 to direct a positive electrical current to solenoid 350 in order to extend sliding clutch 320 towards clutch sleeve 330 and shift dog clutch 300 to the engaged configuration. As another example, controller 372 may command power supply 370 to direct a negative electrical current to solenoid 350 in order to retract sliding clutch 320 from clutch sleeve 330 and shift dog clutch 300 to the disengaged configuration. Thus, controller 372 may adjust dog clutch 300 between the engaged and disengaged configurations by changing the polarity of the electrical current from power supply 370 to solenoid 350. Controller 372 may also establish whether dog clutch 300 is in the engaged configuration or disengaged configuration, e.g., by determining the polarity of the electrical current from power supply 370 to solenoid 350 and monitoring a magnitude of the electrical current from power supply 370 to solenoid 350, as will be understood by those skilled in the art. Thus, a separate sensor for determining a position of sliding clutch 320 may not be necessary to establish whether dog clutch 300 is in the engaged and disengaged configurations.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An automatic transmission, comprising:
   a plurality of planetary gear sets;
   a plurality of shifting elements including a dog clutch, the dog clutch comprising a mating clutch mounted to a gear of the plurality of planetary gear sets,
   the mating clutch defining a plurality of projections;
   a clutch sleeve defining a plurality of projections;
   a sliding clutch defining a plurality of projections;
   a magnet mounted to the sliding clutch; and
   a solenoid positioned adjacent the magnet and configured for selectively adjusting the dog clutch between an engaged configuration and a disengaged configuration, the solenoid positioning the sliding clutch such that the plurality of projections of the sliding clutch mesh with both the plurality of projections of the mating clutch and the plurality of projections of the clutch sleeve in the engaged configuration, the solenoid positioning the sliding clutch such that the plurality of projections of the sliding clutch does not mesh with the plurality of projections of the mating clutch in the disengaged configuration,
   wherein the sliding clutch extends between a first end portion and a second end portion, the sliding clutch having a support positioned at the first end portion of the sliding clutch and a hollow post positioned at the second end portion of the sliding clutch, the plurality of projections of the sliding clutch positioned on the support of the sliding clutch at an outer surface of the sliding clutch, the magnet disposed within the hollow post at a distal end portion of the hollow post, and
   wherein the hollow post of the sliding clutch comprises a non-ferrous material.

2. The automatic transmission of claim 1, wherein the clutch sleeve defines an interior chamber, an inner surface of the clutch sleeve facing the interior chamber of the clutch sleeve, the plurality of projections of the clutch sleeve positioned at the inner surface of the clutch sleeve, the solenoid positioned within the interior chamber of the clutch sleeve.

3. The automatic transmission of claim 1, further comprising a cap mounted to the hollow post at the distal end portion of the hollow post in order to seal the magnet within the hollow post.

4. The automatic transmission of claim 3, wherein the cap comprises a non-ferrous material.

5. The automatic transmission of claim 2, wherein the plurality of projections of the clutch sleeve extend radially inward from the inner surface of the clutch sleeve into the interior chamber of the clutch sleeve.

6. The automatic transmission of claim 1, wherein the clutch sleeve is mounted to another gear of the plurality of planetary gear sets or a transmission housing.

7. The automatic transmission of claim 1, further comprising a controller and a power supply, the power supply electrically coupled to the solenoid, the controller in operative communication with the power supply, the controller configured for selectively actuating the power supply in order to adjust the dog clutch between the engaged and disengaged configurations.

8. The automatic transmission of claim 1, wherein the mating clutch and the clutch sleeve are positioned adjacent each other such that an end face of the mating clutch abuts an end face of the clutch sleeve.

9. The automatic transmission of claim 1, wherein the mating clutch and the clutch sleeve may rotate relative to each other in the disengaged configuration, the sliding clutch coupling the mating clutch and the clutch sleeve together in the engaged configuration such that the mating clutch and the clutch sleeve rotate with each other.

10. A dog clutch for an automatic transmission, comprising:
    a mating clutch defining a plurality of projections at an inner surface of the mating clutch;
    a clutch sleeve defining a plurality of projections at an inner surface of the clutch sleeve;
    a sliding clutch defining a plurality of projections at an outer surface of the sliding clutch;
    a magnet mounted to the sliding clutch; and
    a solenoid positioned adjacent the magnet and configured for selectively adjusting the dog clutch between an engaged configuration and a disengaged configuration, the solenoid positioning the sliding clutch such that the plurality of projections of the sliding clutch mesh with both the plurality of projections of the mating clutch and the plurality of projections of the clutch sleeve in the engaged configuration, the solenoid positioning the sliding clutch such that the plurality of projections of the sliding clutch does not mesh with the plurality of projections of the mating clutch in the disengaged configuration,
    wherein the sliding clutch extends between a first end portion and a second end Portion, the sliding clutch having a support positioned at the first end portion of the sliding clutch and a hollow post positioned at the second end portion of the sliding clutch, the plurality of projections of the sliding clutch positioned on the support of the sliding clutch at an outer surface of the sliding clutch, the magnet disposed within the hollow post at a distal end portion of the hollow post, and
    wherein the hollow post of the sliding clutch comprises a non-ferrous material.

11. The dog clutch of claim 10, wherein the clutch sleeve defines an interior chamber, the inner surface of the clutch sleeve facing the interior chamber of the clutch sleeve, the solenoid positioned within the interior chamber of the clutch sleeve.

12. The dog clutch of claim 10, further comprising a cap mounted to the hollow post at the distal end portion of the hollow post in order to seal the magnet within the hollow post.

13. The dog clutch of claim 12, wherein the cap comprises a non-ferrous material.

14. The dog clutch of claim 11, wherein the plurality of projections of the clutch sleeve extend radially inward from the inner surface of the clutch sleeve into the interior chamber of the clutch sleeve.

15. The dog clutch of claim 10, wherein the mating clutch and the clutch sleeve are positioned adjacent each other such that an end face of the mating clutch abuts an end face of the clutch sleeve.

16. The dog clutch of claim 10, wherein the mating clutch and the clutch sleeve may rotate relative to each other in the disengaged configuration, the sliding clutch coupling the mating clutch and the clutch sleeve together in the engaged configuration such that the mating clutch and the clutch sleeve rotate with each other.

* * * * *